US012414606B2

(12) United States Patent
Woodard

(10) Patent No.: US 12,414,606 B2
(45) Date of Patent: Sep. 16, 2025

(54) KNITTED UPPER WITH TWO SIDES AND AN UNDERFOOT PORTION

(71) Applicant: NIKE, Inc., Beaverton, OR (US)

(72) Inventor: Samantha Woodard, Beaverton, OR (US)

(73) Assignee: NIKE, Inc., Beaverton, OR (US)

( * ) Notice: Subject to any disclaimer, the term of this patent is extended or adjusted under 35 U.S.C. 154(b) by 231 days.

(21) Appl. No.: 17/345,237

(22) Filed: Jun. 11, 2021

(65) Prior Publication Data

US 2021/0298425 A1 Sep. 30, 2021

Related U.S. Application Data

(62) Division of application No. 15/958,513, filed on Apr. 20, 2018, now Pat. No. 11,058,179.

(Continued)

(51) Int. Cl.
*A43B 23/02* (2006.01)
*A43B 21/24* (2006.01)
(Continued)

(52) U.S. Cl.
CPC .......... *A43B 23/0245* (2013.01); *A43B 21/24* (2013.01); *A43B 23/0215* (2013.01);
(Continued)

(58) Field of Classification Search
CPC .. A43B 5/025; A43B 5/02; A43B 1/04; A43B 1/24; A43B 21/24; A43B 23/086;
(Continued)

(56) References Cited

U.S. PATENT DOCUMENTS

| 474,574 A | 5/1892 | Bruzon |
| 660,284 A | 10/1900 | George |

(Continued)

FOREIGN PATENT DOCUMENTS

| CA | 2727714 A1 | 7/2012 |
| CN | 101152027 A | 4/2008 |

(Continued)

OTHER PUBLICATIONS

Intention to Grant received for European Patent Application No. 18723173.3, mailed on Oct. 5, 2021, 7 pages.

(Continued)

*Primary Examiner* — Alissa J Tompkins
*Assistant Examiner* — Dakota Marin
(74) *Attorney, Agent, or Firm* — SHOOK, HARDY & BACON L.L.P.

(57) ABSTRACT

The present disclosure provides a knitted component for an article of footwear. The knitted component may include a first side and a second side, where the first side and the second side form an overfoot portion. An underfoot portion may be located between the first side and the second side, where at least a portion of the first side and at least a portion of the second side of the knitted component are located on one of a medial side and a lateral side of the overfoot portion, and where a knitted course extends from the first side, through the underfoot portion, and to the second side.

14 Claims, 11 Drawing Sheets

Related U.S. Application Data

(60) Provisional application No. 62/488,659, filed on Apr. 21, 2017.

(51) Int. Cl.

| | | |
|---|---|---|
| *A43B 23/04* | (2006.01) | |
| *D04B 7/04* | (2006.01) | |
| *D04B 15/02* | (2006.01) | |
| *A43B 1/04* | (2022.01) | |
| *A43B 5/02* | (2006.01) | |
| *A43B 23/08* | (2006.01) | |
| *G06T 1/00* | (2006.01) | |

(52) U.S. Cl.
CPC ............... *A43B 23/04* (2013.01); *D04B 7/04* (2013.01); *D04B 15/02* (2013.01); *A43B 1/04* (2013.01); *A43B 5/02* (2013.01); *A43B 5/025* (2013.01); *A43B 23/086* (2013.01); *G06T 1/00* (2013.01)

(58) Field of Classification Search
CPC . A43B 23/04; A43B 23/0215; A43B 23/0245; G06T 1/00
USPC .................................................... 36/45, 77 R
See application file for complete search history.

(56) References Cited

U.S. PATENT DOCUMENTS

| | | | |
|---|---|---|---|
| 1,521,338 A | 12/1924 | Swanson | |
| 1,745,654 A | 2/1930 | Nealy | |
| 2,101,723 A | 12/1937 | Elmer | |
| 2,109,751 A | 3/1938 | Eugen et al. | |
| 2,302,596 A | 11/1942 | Albert | |
| 2,677,825 A | 5/1954 | Richardson et al. | |
| 2,891,328 A | 6/1959 | Joseph | |
| 2,934,838 A | 5/1960 | Ferreira | |
| 3,650,051 A * | 3/1972 | Sass ............... | A43B 5/02 36/133 |
| 3,703,775 A | 11/1972 | Gatti | |
| 3,762,075 A | 10/1973 | Munschy | |
| 4,422,249 A | 12/1983 | Hannah | |
| 4,517,753 A | 5/1985 | Rosenbaum et al. | |
| 4,616,432 A | 10/1986 | Bunch et al. | |
| 4,617,746 A | 10/1986 | Hannah | |
| 5,020,247 A | 6/1991 | Barret et al. | |
| 5,106,445 A | 4/1992 | Fukuoka | |
| 5,167,084 A | 12/1992 | Flammier | |
| 6,449,879 B1 * | 9/2002 | Fallon ............... | A43B 5/02 36/50.1 |
| 6,757,991 B2 | 7/2004 | Sussmann | |
| 7,043,788 B2 | 5/2006 | Sheets et al. | |
| 7,127,837 B2 | 10/2006 | Ito | |
| 7,363,731 B2 | 4/2008 | Dana, III | |
| 7,543,397 B2 | 6/2009 | Kilgore et al. | |
| 7,913,424 B1 | 3/2011 | Raith et al. | |
| 7,954,259 B2 | 6/2011 | Antonelli et al. | |
| 8,196,322 B2 | 6/2012 | Atsumi et al. | |
| 8,272,148 B2 | 9/2012 | Nishiwaki et al. | |
| 8,347,438 B2 | 1/2013 | Bell | |
| 8,595,878 B2 | 12/2013 | Huffa et al. | |
| 8,631,590 B2 | 1/2014 | Droege et al. | |
| 8,844,171 B2 | 9/2014 | Eder et al. | |
| 8,973,410 B1 * | 3/2015 | Podhajny ................ | D04B 7/04 36/47 |
| 8,997,529 B1 * | 4/2015 | Podhajny ................ | A43C 1/04 36/47 |
| 9,038,288 B2 | 5/2015 | Droege et al. | |
| 9,179,732 B2 | 11/2015 | Minami | |
| 9,192,204 B1 | 11/2015 | Liles et al. | |
| 9,375,046 B2 * | 6/2016 | Meir ...................... | D04B 1/22 |
| 9,549,591 B2 * | 1/2017 | Uchikawa ............. | D04B 1/108 |
| 9,609,904 B2 | 4/2017 | Zwick et al. | |
| 9,637,847 B2 | 5/2017 | Terai et al. | |
| 9,661,892 B2 * | 5/2017 | Meir .................. | A43B 23/0265 |
| 9,743,710 B2 | 8/2017 | Madelaine et al. | |
| 9,771,673 B2 * | 9/2017 | Ikenaka .................. | A43B 1/04 |
| 9,775,401 B2 * | 10/2017 | Cross ..................... | D04B 1/16 |
| 9,907,349 B2 * | 3/2018 | Huffman ................ | A43B 1/04 |
| 9,936,757 B2 * | 4/2018 | Podhajny ............. | A43B 23/042 |
| 9,976,236 B2 * | 5/2018 | Terai ...................... | D04B 1/24 |
| 10,136,695 B2 | 11/2018 | Smith et al. | |
| 10,172,422 B2 * | 1/2019 | Podhajny ................ | A43B 1/04 |
| 10,178,893 B1 * | 1/2019 | Baker ..................... | A43B 3/242 |
| 10,182,621 B2 | 1/2019 | Holt | |
| 10,342,288 B2 | 7/2019 | Yoshida et al. | |
| 10,435,825 B2 * | 10/2019 | MacGilbert ............. | D04B 7/14 |
| 10,499,710 B2 | 12/2019 | Innocente | |
| 2003/0089136 A1 * | 5/2003 | Lynch ..................... | D04B 9/40 66/187 |
| 2008/0086914 A1 | 4/2008 | Curry | |
| 2011/0197475 A1 | 8/2011 | Weidl et al. | |
| 2014/0202034 A1 | 7/2014 | Vanatta | |
| 2016/0081419 A1 | 3/2016 | Theoklitos et al. | |
| 2017/0000210 A1 | 1/2017 | Bigolin | |
| 2018/0184755 A1 * | 7/2018 | Yumiba ................. | A43B 9/02 |
| 2018/0199668 A1 * | 7/2018 | Yumiba ................. | D04B 7/30 |
| 2018/0303204 A1 | 10/2018 | Woodard | |

FOREIGN PATENT DOCUMENTS

| | | |
|---|---|---|
| CN | 101768825 A | 7/2010 |
| CN | 202849693 U | 4/2013 |
| CN | 105121725 A | 12/2015 |
| CN | 205030620 U | 2/2016 |
| CN | 106460263 A | 2/2017 |
| CN | 205913005 U | 2/2017 |
| EP | 0562697 A1 | 9/1993 |
| EP | 2987897 A1 | 2/2016 |
| WO | 2014/171300 A1 | 10/2014 |
| WO | 2015038243 A1 | 3/2015 |

OTHER PUBLICATIONS

Extended European Search Report received for European Patent Application No. 22150247.9, mailed on Jun. 14, 2022, 11 pages.
Office Action received for European Patent Application No. 22150247.9 mailed on Feb. 24, 2023, 7 pages.
Office Action received for European Patent Application No. 22150247.9, mailed on Sep. 14, 2023, 5 pages.

* cited by examiner

KNITTED UPPER WITH TWO SIDES AND AN UNDERFOOT PORTION

CROSS-REFERENCE TO RELATED APPLICATIONS

This application claims the benefit of U.S. application Ser. No. 15/958,513, filed Apr. 20, 2018, which claims the benefit of U.S. Provisional Application No. 62/488,659, filed Apr. 21, 2017, the entireties of which are hereby incorporated by reference.

BACKGROUND

A variety of articles are formed from textiles. As examples, articles of apparel (e.g., shirts, pants, socks, footwear, jackets and other outerwear, briefs and other undergarments, hats and other headwear), containers (e.g., backpacks, bags), and upholstery for furniture (e.g., chairs, couches, car seats) are often at least partially formed from textiles. These textiles are often formed by weaving or interlooping (e.g., knitting) a yarn or a plurality of yarns, usually through a mechanical process involving looms or knitting machines. One particular object that may be formed from a textile is an upper for an article of footwear.

Conventional articles of footwear generally include two primary elements: an upper and a sole structure. The upper is secured to the sole structure and forms a void within the article of footwear for comfortably and securely receiving a foot. The sole structure is secured to a lower surface of the upper so as to be positioned between the upper and the ground. In some articles of athletic footwear, for example, the sole structure may include a midsole and an outsole. The midsole may be formed from a polymer foam material that attenuates ground reaction forces to lessen stresses upon the foot and leg during walking, running, and other ambulatory activities. The outsole may be secured to a lower surface of the midsole and forms a ground-engaging portion of the sole structure that is formed from a durable and wear-resistant material.

The upper of the article of footwear generally extends over the instep and toe areas of the foot, along the medial and lateral sides of the foot, and around the heel area of the foot. Access to the void on the interior of the upper is generally provided by an ankle opening in a heel area of the footwear. A lacing system is often incorporated into the upper to adjust the fit of the upper, thereby facilitating entry and removal of the foot from the void within the upper. The upper may include a tongue that extends under the lacing system to enhance adjustability of the footwear, and the upper may incorporate a heel counter to limit movement of the heel.

BRIEF SUMMARY

In one aspect, the present disclosure provides a knitted component for an article of footwear, the knitted component including a first side and a second side, the first side and the second side forming an overfoot portion, and an underfoot portion positioned between the first side and the second side. At least a portion of the first side and at least a portion of the second side of the knitted component may each be configured to be positioned on one of a medial side and a lateral side of the overfoot portion, and a course of the knitted component may extend from the first side, through the underfoot portion, and to the second side.

The course may be formed by a single pass of a knitting machine.

The first side may include a toe portion, the toe portion having an underfoot side, an overfoot side, and a cavity therebetween. The cavity may form at least a portion of a void for receiving a foot. The toe portion may include a connection structure formed on a knitting machine and joining the underfoot side and the overfoot side. The underfoot side of the toe portion may include a first edge, where the underfoot portion includes a second edge, and where the first edge is joined to the second edge. The first edge and the second edge may be joined at a seam, and the seam may be configured to be located beneath a foot of a wearer when the article of footwear is in use.

The knitted component may further include a cup-shaped heel portion with a first edge configured to form a collar of the article of footwear. The heel portion may extend from the underfoot portion.

A fastening element may be coupled to the first side and the second side and configured to pull the first side with respect to the second side to tighten the knitted component around a foot.

In another aspect, the present disclosure provides a method. The method may include knitting a first side of a knitted component, knitted a second side of the knitted component, where the first side and the second side form an overfoot portion, and knitting an underfoot portion positioned between the first side and the second side. At least a portion of the first side and at least a portion of the second side of the knitted component may be located on one of a medial side and a lateral side of the overfoot portion, and a knitted course may extend from the first side, through the underfoot portion, and to the second side.

The course may be formed by a single pass of a knitting machine.

The first side may include a toe portion, the toe portion having an underfoot side, an overfoot side, and a cavity therebetween. Knitting the toe portion of the first side may include knitting the overfoot side while holding loops on a needle bed, and joining the loops held on the needle bed to the underfoot side when knitting the underfoot side. A connection structure may be formed when joining the loops held on the needle bed to the underfoot side, where the connection structure joins the overfoot side and the underfoot side. The cavity may form at least a portion of a void for receiving a foot. The underfoot side of the toe portion may include a first edge, where the underfoot portion includes a second edge, and where the first edge is joined to the second edge. The method may further include joining the first edge and the second edge at a seam, where the seam is configured to be located beneath a foot of a wearer when the knitted component is incorporated into an article of footwear.

The knitted component may include a cup-shaped heel portion with a first edge configured to form a collar defining an opening to a void. Knitting the heel portion may include knitting a first portion of the heel portion while holding loops on a needle bed, and joining the loops held on the needle bed to a second portion of the heel portion while knitting the second portion of the heel portion, where joining the loops held on the needle bed to the second portion forms a connection structure joining the first portion to the second portion.

In another aspect, the present disclosure provides another embodiment of a knitted component for an article of footwear. The knitted component may include a first side and a second side, the first side and the second side forming an overfoot portion. The knitted component may further include an underfoot portion positioned between the first side and the second side, where the first side includes a toe portion, the toe portion having an underfoot side, an overfoot side, and a cavity therebetween, where the cavity forms at least a portion of a void for receiving a foot, and where the toe portion includes a connection structure formed on a knitting machine and joining the underfoot side and the overfoot side.

A loop included in a course forming the overfoot side may be held on a needle bed when forming the overfoot side, and the loop may be included in the connection structure.

In another aspect, the present disclosure provides another embodiment of a method. The method may include knitting a first side of a knitted component, where the first side includes a toe portion, the toe portion having an underfoot side, an overfoot side, and a cavity therebetween, where the cavity forms at least a portion of a void for receiving a foot, and where knitting the toe portion includes knitting a connection structure joining the underfoot side and the overfoot side.

The connection structure may include holding a loop on a needle bed of the knitting machine for at least one course. Knitting the connection structure may include holding a loop on a needle bed while knitting at least a portion of the overfoot portion, and then knitting with the loop held on the needle bed when knitting the underfoot portion.

DETAILED DESCRIPTION

Figure 1:
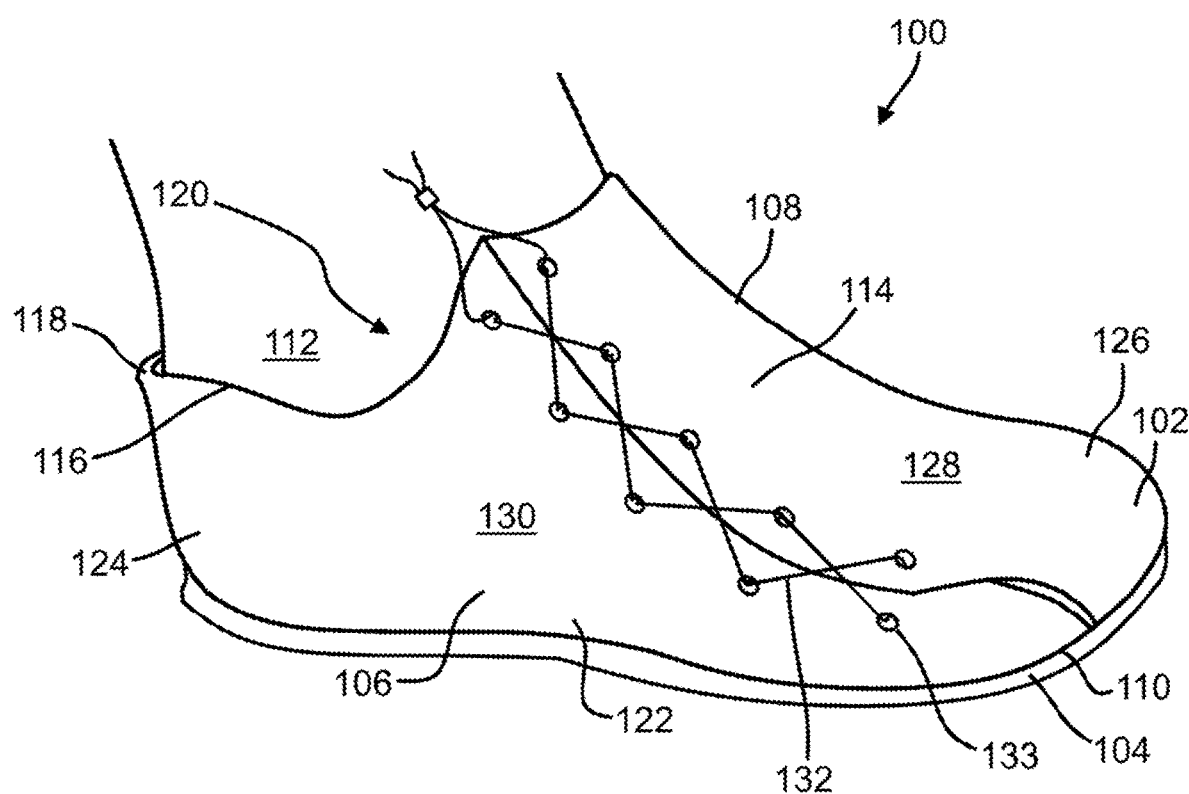
FIG. 1 is an illustration showing an article of footwear formed with a knitted component in accordance with an embodiment of the present disclosure.

Various aspects are described below with reference to the drawings in which like elements generally are identified by like numerals. The relationship and functioning of the various elements of the aspects may better be understood by reference to the following detailed description. However, aspects are not limited to those illustrated in the drawings or explicitly described below. It also should be understood that the drawings are not necessarily to scale, and in certain instances details may have been omitted that are not necessary for an understanding of aspects disclosed herein, such as conventional fabrication and assembly.

Certain aspects of the present disclosure relate to articles at least partially formed from textiles. One example of an article is an article of apparel (e.g., shirts, pants, socks, footwear, jackets and other outerwear, briefs and other undergarments, hats and other headwear, or the like). The article may be an upper configured for use in an article of footwear. The upper may be used in connection with any type of footwear. Illustrative, non-limiting examples of articles of footwear include a basketball shoe, a biking shoe, a cross-training shoe, a global football (soccer) shoe, an American football shoe, a bowling shoe, a golf shoe, a hiking shoe, a ski or snowboarding boot, a tennis shoe, a running shoe, and a walking shoe. The upper may also be incorporated into a non-athletic shoe, such as a dress shoe, a loafer, and a sandal.

Referring to FIG. 1, an article of footwear 100 may include an upper 102 secured to a sole structure 104. The upper 102 may include a lateral side 106 and a medial side 108. The area where the sole structure 104 joins the upper 102 may be referred to as the biteline 110. The upper 102 may be joined to the sole structure 104 in a fixed manner using any suitable technique, such as through the use of an adhesive, by sewing, etc. It is contemplated that the upper 102 may extend partially or completely around a foot 112 of a wearer and/or may be integral with the sole, and a sockliner may or may not be used. In some embodiments, the sole structure 104 may include a midsole (not shown) and an outsole.

The article of footwear 100 may additionally comprise a throat area 114 and an ankle opening 116, which may be surrounded by a collar 118 and may lead to a void 120. The void 120 of the article of footwear 100 may be configured to accommodate a foot of a person. The throat area 114 may be generally disposed in a midfoot area 122 of the upper 102. The midfoot area 122 of the upper 102 may be located between a heel area 124 and a toe area 126. In some embodiments, a tongue may be disposed in the throat area 114, but a tongue is an optional component. The tongue may be any type of tongue, such as a gusseted tongue or a burrito tongue. If a tongue is not included (or in combination with a tongue), the lateral and medial sides of the throat area 114 may be joined together. For example, as depicted in FIG. 1 and described in more detail below, the upper 102 may be formed into its wearable shape when a first side 128 is joined to and/or overlaps a second side 130.

As shown in FIG. 1, the article of footwear 100 may include an optional fastening element 132 (which may be associated with the apertures 133). Any suitable type of fastening element may be used, such as a shoelace, cable-tensioning system, and/or any other suitable device. The fastening element 132 may be coupled to both the first side 128 and the second side 130 of the upper 102 and may pull the first side 128 and the second side 130 together in response to actuation initiated by the user or another device, for example, to thereby tighten the upper 102 around the foot 112.

Figure 2:
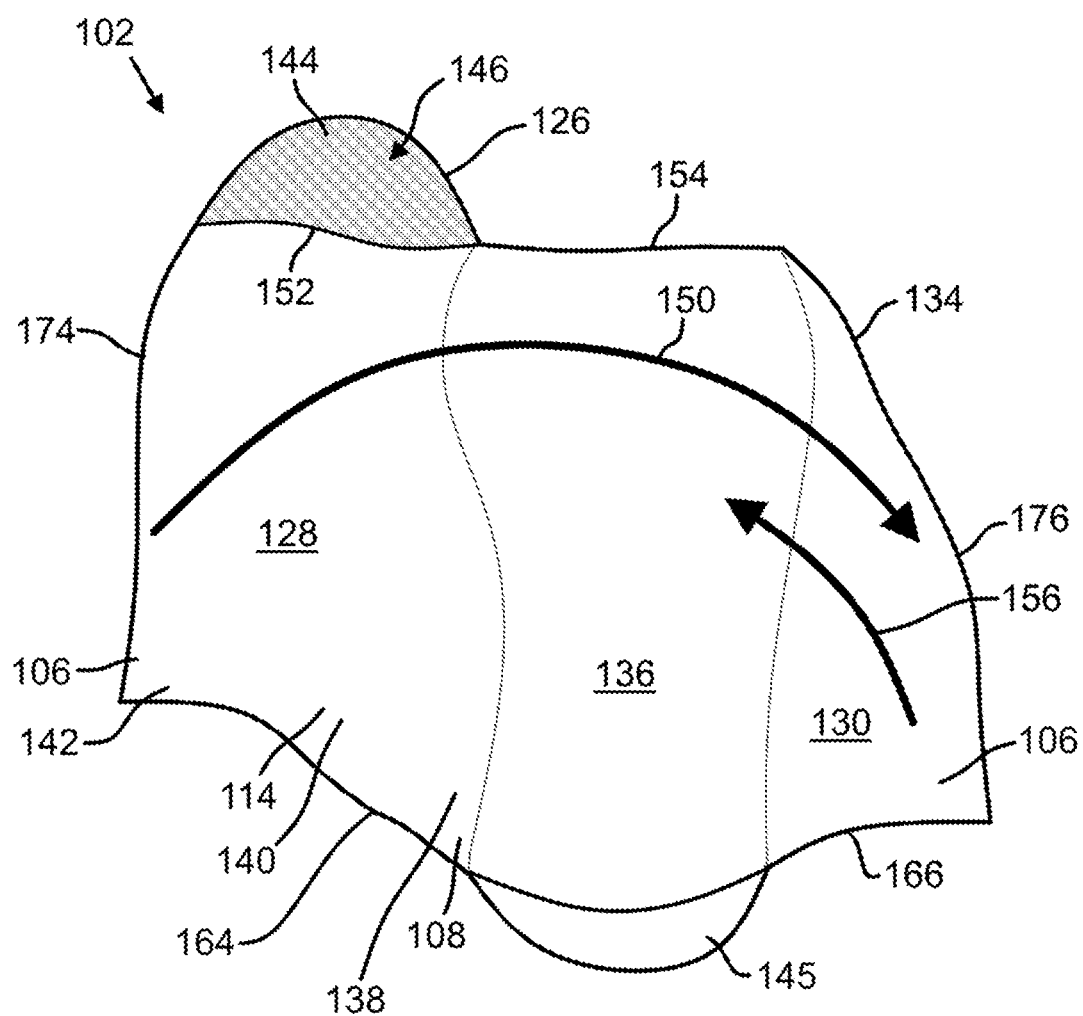
FIG. 2 is an illustration showing a top view of a knitted component with an overfoot portion and an underfoot portion included in the article of footwear of FIG. 1, where the knitted component is in an unfolded state.

Referring to FIG. 2, at least a portion of the upper 102, and potentially substantially the entirety of the upper 102, may be formed of a knitted component 134. FIG. 2 shows the upper 102 formed by the knitted component 134 as it may appear after a knitting process (such as a weft-knitting process on a flat knitting machine as described in FIG. 8 below). The knitted component 134 may form an underfoot portion 136, as shown. The underfoot portion 136 may be configured to extend under the foot of a wearer when the article of footwear is in use and may couple to, and/or at least partially form, a midsole and/or an outsole. The knitted component 134 may be formed as an integral one-piece element during a knitting process, such as a weft knitting process (e.g., with a flat knitting machine or circular knitting machine), a warp knitting process, or any other suitable knitting process. That is, the knitting process on the knitting machine may substantially form the knit structure of the knitted component 134 without the need for significant post-knitting processes or steps. Alternatively, two or more portions of the knitted component 134 may be formed separately as distinct integral one-piece elements and then the respective elements attached.

Forming the upper 102 with the knitted component 134 may provide the upper 102 with advantageous characteristics including, but not limited to, a particular degree of elasticity (for example, as expressed in terms of Young's modulus), breathability, bendability, strength, moisture absorption, weight, abrasion resistance, and/or a combination thereof. These characteristics may be accomplished by selecting a particular single layer or multi-layer knit structure (e.g., a ribbed knit structure, a single jersey knit structure, or a double jersey knit structure), by varying the size and tension of the knit structure, by using one or more yarns formed of a particular material (e.g., a polyester material, a relatively inelastic material, or a relatively elastic material such as spandex), by selecting yarns of a particular size (e.g., denier), and/or a combination thereof. The knitted component 134 may also provide desirable aesthetic characteristics by incorporating yarns having different colors, textures or other visual properties arranged in a particular pattern. The yarns themselves and/or the knit structure formed by one or more of the yarns of the knitted component 134 may be varied at different locations such that the knitted component 134 has two or more portions with different properties (e.g., a portion forming the throat area 114 of the upper 102 may be relatively elastic while another portion may be relatively inelastic). In some embodiments, the knitted component 134 may incorporate one or more materials with properties that change in response to a stimulus (e.g., temperature, moisture, electrical current, magnetic field, or light). For example, the knitted component 134 may include yarns formed of a thermoplastic polymer material (e.g., polyurethanes, polyamides, polyolefins, and nylons) that transitions from a solid state to a softened or liquid state when subjected to certain temperatures at or above its melting point and then transitions back to the solid state when cooled. The thermoplastic polymer material may provide the ability to heat and then cool a portion of the knitted component 134 to thereby form an area of bonded or continuous material that exhibits certain advantageous properties including a relatively high degree of rigidity, strength, and water resistance, for example.

Still referring to FIG. 2, the knitted component 134 may include the first side 128 which may extend from a medial side 108 of the underfoot portion 136, and a second side 130 which may extend from a lateral side 106 of the underfoot portion 136 (or vice versa). The first side 128 may extend a distance from the underfoot portion 136 such that it has a first portion 138 corresponding to (e.g., configured to form a portion of) the medial side of the upper 102, a second portion 140 corresponding to the throat area 114 of the upper 102, and a third portion 142 corresponding to the lateral side of the upper 102. The second side 130, which may include less area than the area of the first side 128, may be configured to form only a portion of the lateral side of the upper 102 (as shown). Alternatively, the second side 130 may be larger than depicted in FIG. 2 when it is desirable for the second side 130 to extend beyond the lateral side (e.g., to the throat area and/or to the medial side) when folded. Alternatively, the first side 128 and the second side 130 could be switched around with respect to the medial and lateral directions.

The first side 128 may include a toe portion 144 of the knitted component 134, which may be located in the toe area 126 of the completed upper 102 (shown in FIG. 1). As depicted in FIG. 2 and described in more detail below with reference to FIGS. 9-10, the toe portion 144 may include a cup-like shape such that an underfoot toe surface 146 (shaded for illustration) is opposite an underfoot midfoot surface 148 (and it is noted that the underfoot midfoot surface 148 is facing away from the viewer such that it is not visible in FIG. 2; see FIG. 4). Similarly, a heel portion 145 may extend from the underfoot portion 136 and have a cup-like shape for receiving a heel of the wearer. When the first side 128 is folded along the first arrow 150, the underfoot toe surface 146 may invert such that, once the fold is complete, it faces the same direction as the underfoot midfoot surface 148. An edge 152 of the toe portion 144 may then be joined to an edge 154 of the underfoot midfoot surface 148 as described in more detail below (with reference to FIG. 5). A rear edge 164 of the first side 128 and a rear edge 166 of the second side 130 may be configured to form a collar of the upper.

Figure 6:
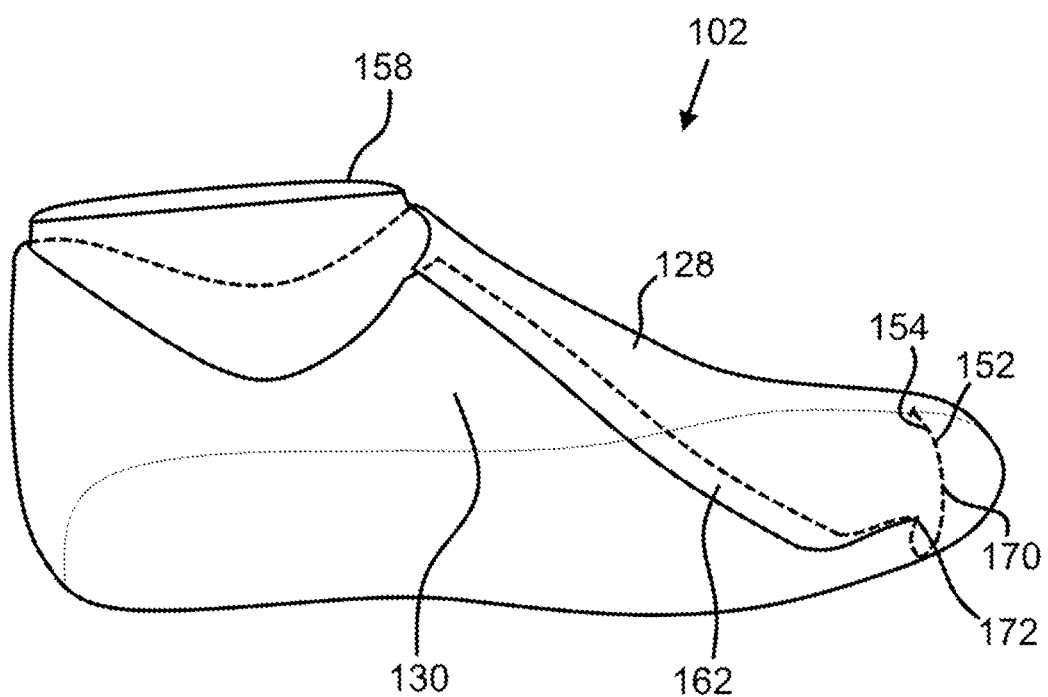
FIG. 6 is an illustration showing a lateral-side view of the knitted component of FIGS. 2-5 in the folded state.

When forming the upper 102, and after the knitting process, the second side 130 may be folded in a direction corresponding to the second arrow 156 and opposite of the direction that the first arrow 150. Thus, when the first side 128 and/or the second side 130 extend far enough from the underfoot portion 136, an outer edge 174 of the first side 128 and an outer edge 176 the second side 130 may overlap when the upper 102 is formed (as shown in FIG. 6). Alternatively, it is contemplated that a different, non-depicted portion (e.g., a tongue) of the upper may be located between the first side 128 and the second side 130. Also, while not shown, the second side 130 may extend far enough from the underfoot portion 136 such that it can reach the throat area and even the lateral side of the upper when folded, which may be advantageous when it is desirable to provide two layers of knitted material over the foot, for example.

Figure 3:
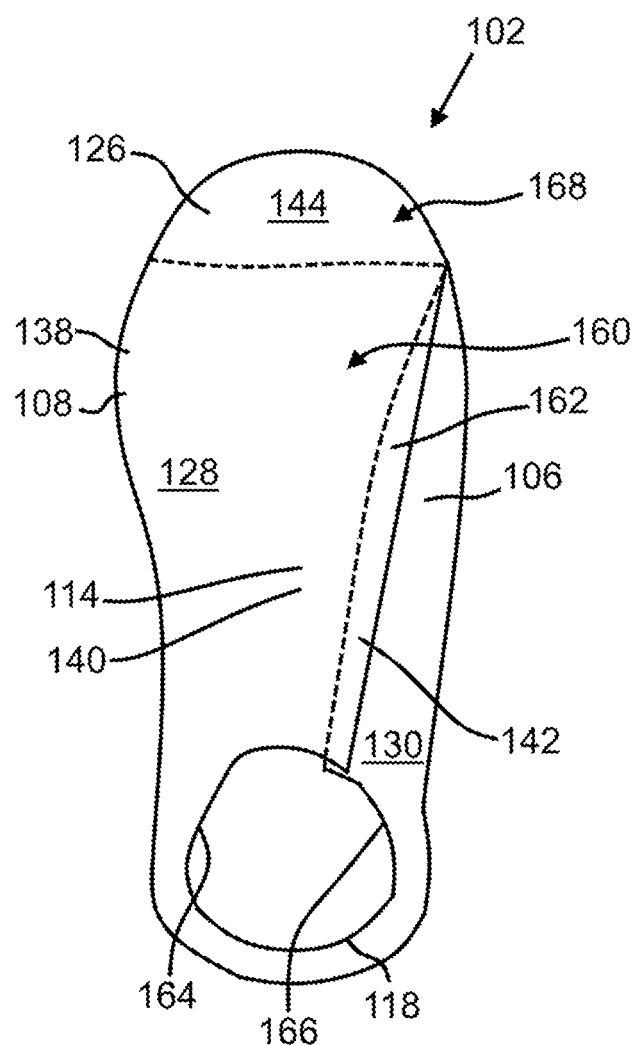
FIG. 3 in an illustration showing a top view of the knitted component of FIG. 2 in a folded state.

FIG. 3 shows the upper 102 of FIG. 2 in a folded state. Folding or otherwise manipulating the upper 102 into an appropriate shape for use in an article of footwear may include incorporating a last and an associated method of lasting. An example of a lasting process is described in U.S. patent application Ser. No. 12/848,352, filed Aug. 2, 2010, and issued as U.S. Pat. No. 8,595,878, which is herein incorporated by reference in its entirety.

As shown in FIG. 3, the first side 128 has been folded such that the first portion 138 forms an outer surface 160 of the upper 102 on the medial side 108, the second portion 140 forms the outer surface 160 of the upper 102 at the throat area 114, and the third portion 142 forms the outer surface 160 on the lateral side 106 of the upper 102. Similarly, the second side 130 forms the outer surface 160 on the lateral side of the upper 102. Further, the first side 128 and the second side 130 overlap at the overlapped area 162. Either of the first side 128 and the second side 130 may be exposed on the outer surface 160 at the overlap area 162 (and in this case, the first side 128). The rear edge 164 of the first side 128 and the rear edge 166 of the second side may form at least a portion of the collar 118, as shown. In the toe area 126, the outer surface 160 may be formed by the toe portion 144 (and specifically an overfoot toe surface 168 of the toe portion 144), which may be a portion of the first side 128.

Figure 4:
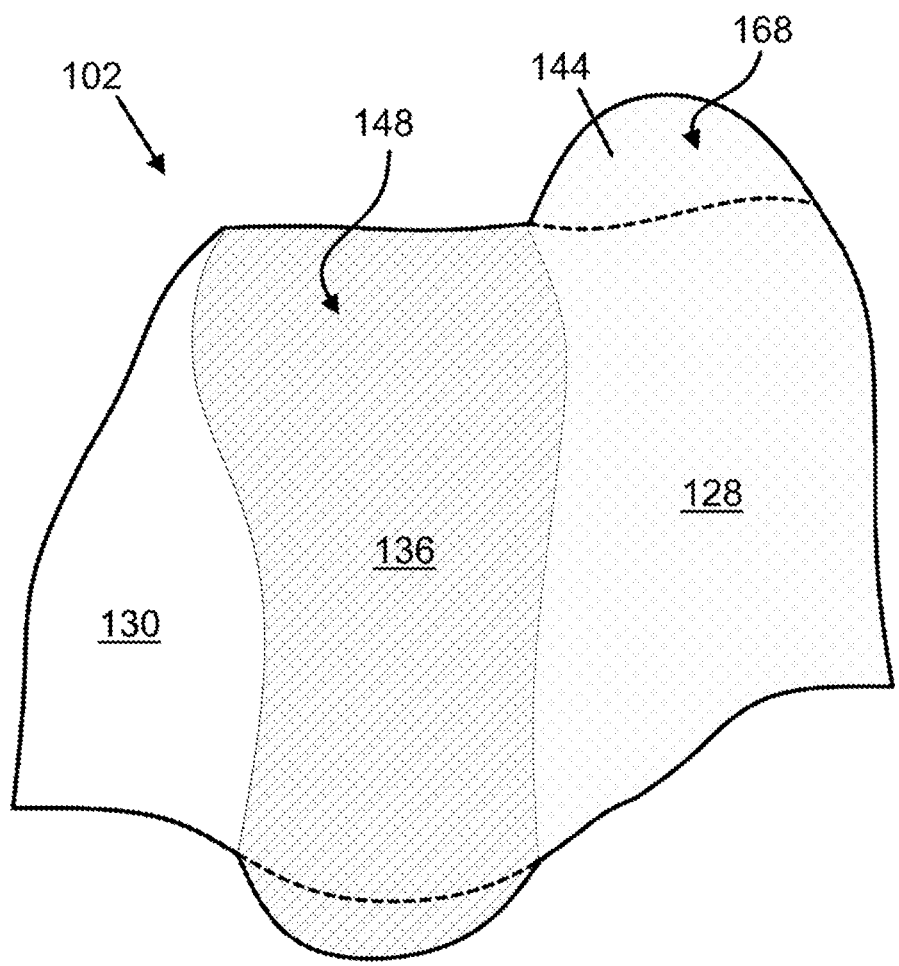
FIG. 4 is an illustration showing a bottom view of the knitted component of FIGS. 2-3 in the unfolded state.

FIG. 4 shows a bottom view of the upper 102, again in the unfolded state of FIG. 2. The underfoot midfoot surface 148 of the underfoot portion 136, which is positioned between the first side 128 and the second side 130, is shaded for illustration, but this may or may not be the case in practice. It is contemplated that, prior to folding or otherwise manipulating the upper 102 into its wearable shape, the first side 128 and/or the second side 130 may not be discernable from the underfoot portion 136.

As shown in FIG. 4, the toe portion 144 of the first side 128 may include an overfoot toe surface 168 facing the same direction as the underfoot midfoot surface 148 in the depicted unfolded state. Once the upper 102 is manipulated into its folded state, the overfoot toe surface 168 may invert such that it is located above a toe of the wearer in the completed upper 102. The underfoot toe surface 146 (described above and depicted in FIG. 2) is facing away from the viewer in FIG. 4.

Figure 5:
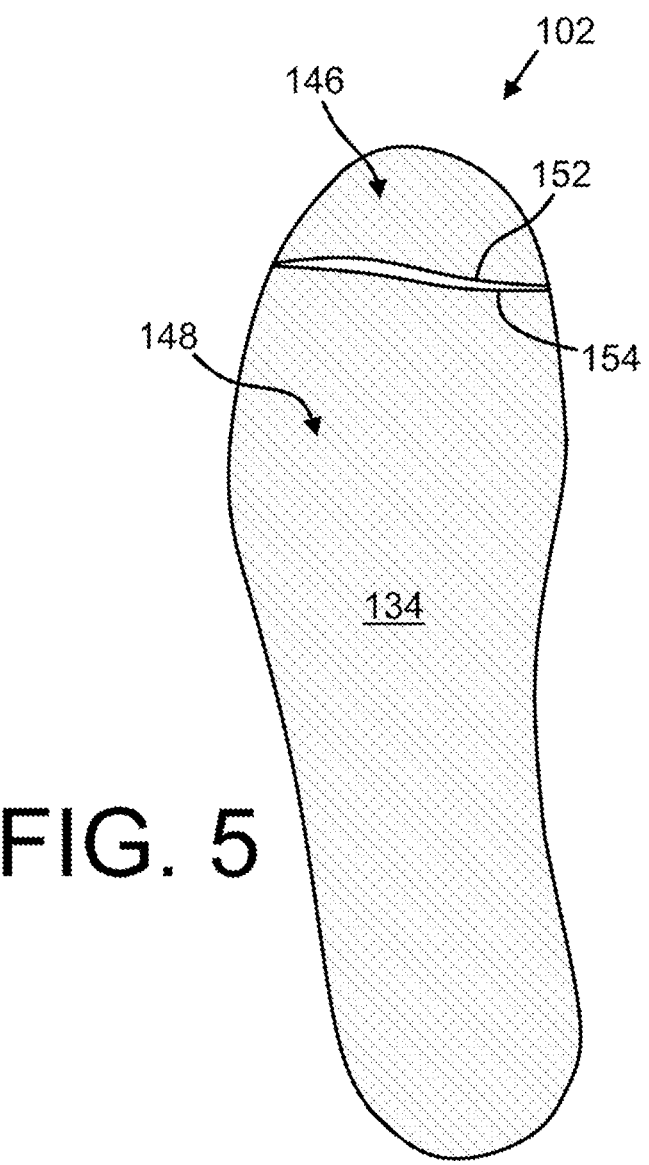
FIG. 5 is an illustration showing a bottom view of the knitted component of FIGS. 2-4 in the folded state.

FIG. 5 shows the bottom view of FIG. 4 when the upper 102 is manipulated to its folded state. As shown, the underfoot midfoot surface 148 remains facing away from the foot of a wearer and towards the viewer in FIG. 5. The underfoot toe surface 146 has been inverted with respect to the unfolded state such that, in the folded state, the underfoot toe surface 146 faces the same direction as the underfoot midfoot surface 148. The overfoot toe surface 168 (of FIG. 4) has also been inverted and now faces away from the viewer, and thus it is not visible in FIG. 5.

Once in the folded state, the edge 152 of the toe portion 144 may then be aligned with and adjacent to the edge 154 of the underfoot midfoot surface 148. In some embodiments, the edge 152 may be joined to the edge 154 by any suitable apparatus or method, and it is contemplated that the step of joining the edge 152 to the edge 154 may take place after the knitted component 134 is removed from the knitting machine and during or after the lasting step. Joining the edge 152 to the edge 154 may include sewing or tying, using an adhesive, using a mechanical clamp, etc. In some embodiments, the edge 152 and the edge 154 may be indirectly coupled (i.e., due to each independently being joined to a sole structure).

FIG. 6 shows another view (i.e., a lateral-side view) of the upper 102 in the folded state and on a last 158. As shown, the edge 152 and the edge 154 may form a seam 170 located in the toe area of the upper 102 and under the foot of a wearer. Advantageously, the current embodiment may hide the seam from view (e.g., when a sole structure covers the seam), thus potentially increasing the aesthetic appeal of the article of footwear and protecting the seam 170 from wear and tear. The seam 170 may have an end 172 where the first side 128 and the second side 130 meet when the upper 102 is in the folded state. As shown, the first side 128 and the second side 130 may optionally overlap at the overlap area 162, and the overlapped area 162 may terminate at the end 172 of the seam 170.

Figure 7:
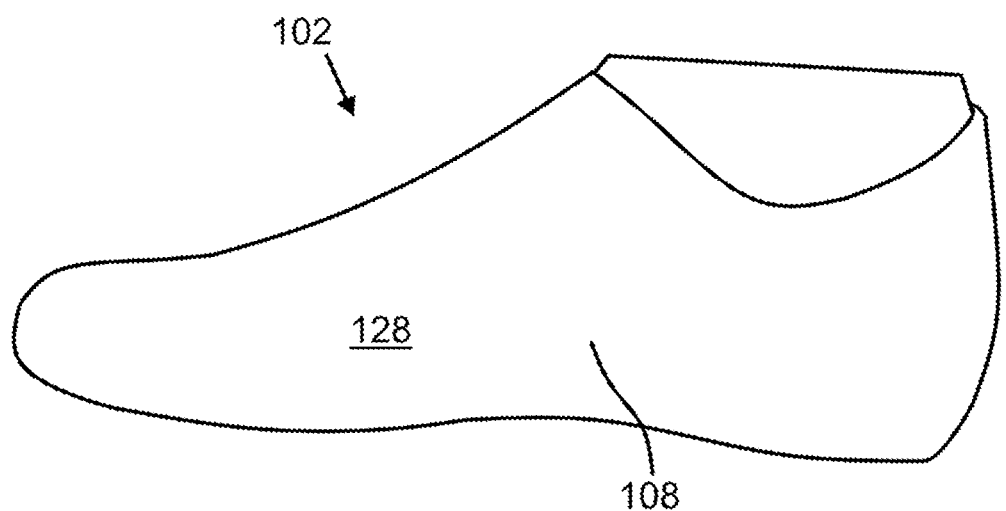
FIG. 7 is an illustration showing a medial-side view of the knitted component of FIGS. 2-6 in the folded state.

FIG. 7 shows the upper 102 (without hidden lines) shown from a medial-side perspective when in the folded state. As shown, the medial side may be substantially formed by the first side 128. This may be advantageous where it is desirable for the medial side to have a continuous and uniform appearance, for example. Further, the first side 128 may provide the medial side 108 with particular mechanical properties (e.g., stretchability, strength, etc.) and/or uniform surface characteristics such that the upper 102 is suitable for a particular activity. For example, the medial side 108 may be formed with particular mechanical properties and particular surface characteristics for kicking a ball with the medial side of the foot, which may be a common form of kicking when playing global football (also called soccer).

Figure 8:
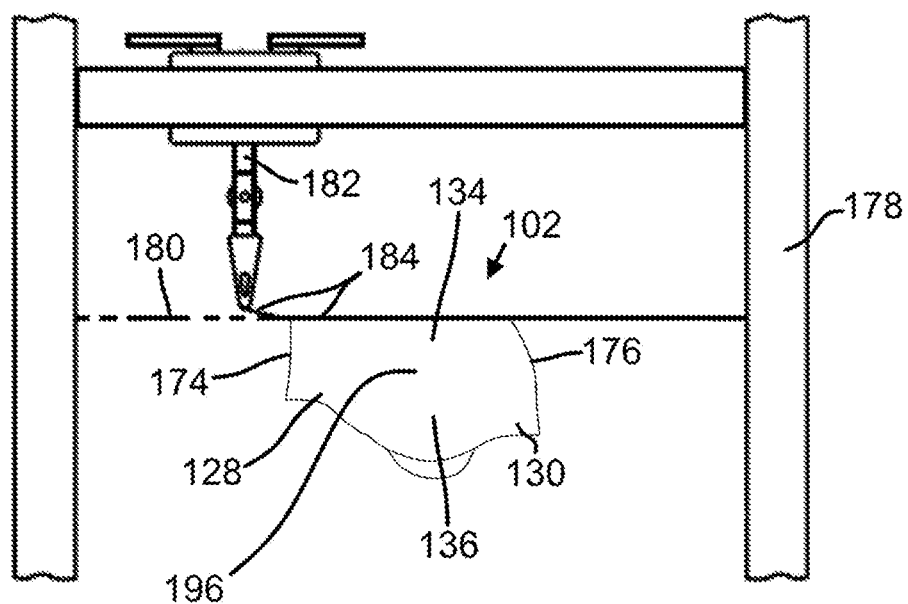
FIG. 8 is an illustration showing the knitted component of FIGS. 2-7 when being formed on a knitting machine.

Referring to FIG. 8, the knitted component 134 may be formed on a knitting machine 178. In particular, the knitted component 134 may include a seamless portion formed on the knitting machine 178 and extending from the outer edge 174 of the first side 128, through the underfoot portion 136, and to the outer edge 176 of the second side 130. The outer edges 174, 176 may be terminal ends of the knitted component 134 during knitting process and/or after the knitting process when the knitted component 134 is removed from the knitting machine 178. When forming the knitted component 134, the knitted component 134 may be oriented with respect to needle bed(s) 180 of the knitting machine 178 such that a feeder 182 of the knitting machine 178 is capable of moving in a single pass (i.e., without changing its feed direction direction) to knit a first course 184 extending from the outer edge 174 of the first side 128, through the underfoot portion 136, and to the outer edge 176 of the second side (and/or vice versa). Thus, when the knitted component 134 is formed and removed from the knitting machine, the continuous first course 184 (which may include one or more yarns dispensed from the feeder 182 during the single pass) may extend from the outer edge 174 of the first side 128, through the underfoot portion 136, and to the outer edge 176 of the second side 130.

In some embodiments, the first course 184 may include a continuous strand of yarn. Additionally or alternatively, one or more strands of yarn forming at least a portion of the first course 184 may extend less than the full length of the first course 184. For example, it is contemplated that a strand of yarn may extend from the outer edge 174 and towards the underfoot portion 136, but may terminate within the first course 184 prior to extending into the underfoot portion 136. Similarly, it is contemplated that a strand of yarn may extend within the first course 184 from the underfoot portion 136 to the outer edge 176 of the second side 130. Advantageously, the first course 184 may provide different portions of the knitted component with different characteristics (e.g., the underfoot portion 136 may have yarns suitable for attaching to a sole structure, while the yarns of the first and/or second sides 128, 130 may be suitable for forming the overfoot portion of the upper 102).

Figure 9:
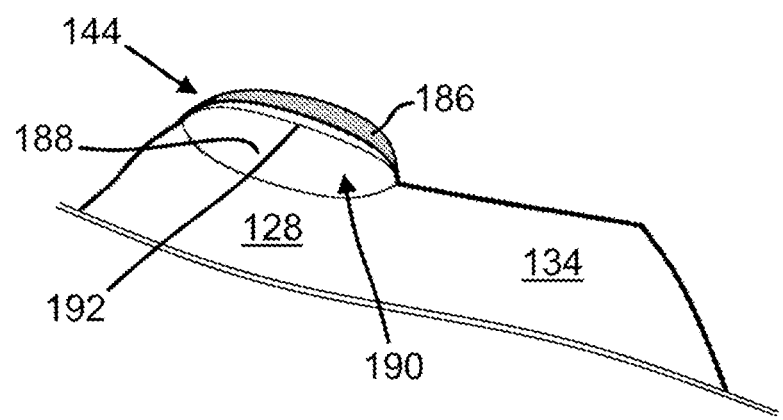
FIG. 9 is an illustration showing a close-up view of a toe portion of the knitted component of FIGS. 2-8.

FIG. 9 is an illustration showing a close-up view of the toe portion 144 of the first side 128 of the knitted component 134. An underfoot side 186 of the toe portion 144 (which is inverted in FIG. 9) may form the underfoot toe surface 146 as described in more detail above, and an overfoot side 188 of the toe portion 144 may be inverted during the folding step such that it at least partially forms the toe area of the overfoot portion of the article of footwear (see FIG. 1). The underfoot side 186 and the overfoot side 188 may be curved such they form a cup-like shape, and a cavity 190 may be formed between the underfoot side 186 and the overfoot side 188 and may form a portion of the void of the article of footwear. A connection structure 192 may secure the underfoot side 186 to the overfoot side 188. The connection structure 192 may be formed with the rest of the knitted component (e.g., an integral one-piece element). That is, the same knitting process may form at least one of the underfoot side 186 and the overfoot side 188 on the knitting machine, and the knitting machine may also form the connection structure 192 without the need for significant post-knitting processes or steps. In alternative embodiments, the connection structure 192 may be formed after the knitting process (e.g., by sewing the underfoot side 186 and the overfoot side 188 together). While not shown in FIG. 9, the heel portion 145 (shown in FIG. 2) of the knitted component may have a similar cup-like structure and may be formed with a similar process.

Figure 10:
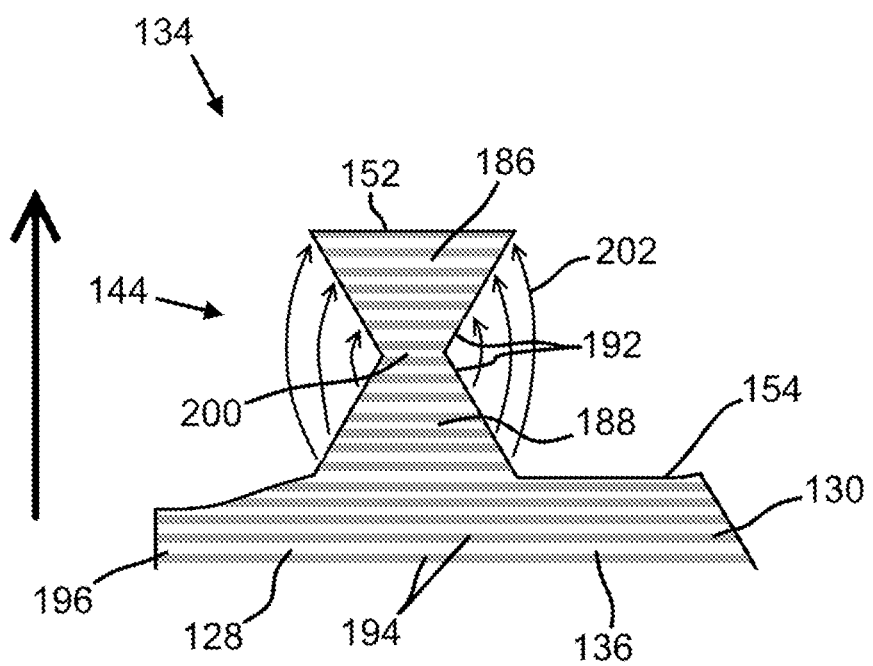
FIG. 10 is a diagram of an embodiment of a knitting process for forming a portion of the knitted component of FIG. 9.

FIG. 10 is a diagram ("the knit diagram") illustrating a knitting sequence of one method of forming the portion of the knitted component 134 depicted in FIG. 9. Each shaded horizontal line 194 may represent a course or a certain number of courses, for example. The sequence may be performed in the direction depicted by the large bolded arrows. The labeled locations of FIG. 10 correspond with the labeled elements of FIG. 9.

Knitting courses at the central portion 196 may correspond with knitting courses extending across the first side 128, the underfoot portion 136, and the second side 130 of the upper 102 (and it is noted that FIG. 8 depicts a knitting machine at the time it is forming the central portion 196 of the upper 102). Once the knitting machine reaches the edge 154, the knitting machine may stop knitting the underfoot portion 136 and the second side 130. It may, however, continue knitting the toe portion 144 of the first side 128.

When knitting the toe portion 144 of the first side 128, the knitting machine may first knit the overfoot side 188 of the toe portion 144 (which is inverted when it is removed from the knitting machine). The overfoot side 188, as it is initially formed, may be continuous with the remainder of the first side 128. As the knitting machine continues along the overfoot side 188 and as its pattern narrows, it may hold loops forming the terminal outer portions of the overfoot side 188 on the needles of a needle bed rather than releasing them. Once the knitting machine reaches the narrow 200 (which represents the terminal end of the toe portion 144 once the knitting process is finished), the knitting machine may continue knitting the inverted underfoot side 186 while simultaneously re-joining the loops held on the needle bed as the pattern widens. The rejoining of the loops is depicted by the arrows 202. The rejoining of the loops may form the connection structure 192 described with reference to FIG. 9 above. The end result of this process may be the cup-like toe portion 144 of the knitted component 134, which is described in detail above. The last course formed on the knitting machine may correspond with the edge 152 (also shown in FIG. 2 and FIG. 5).

Figure 11:
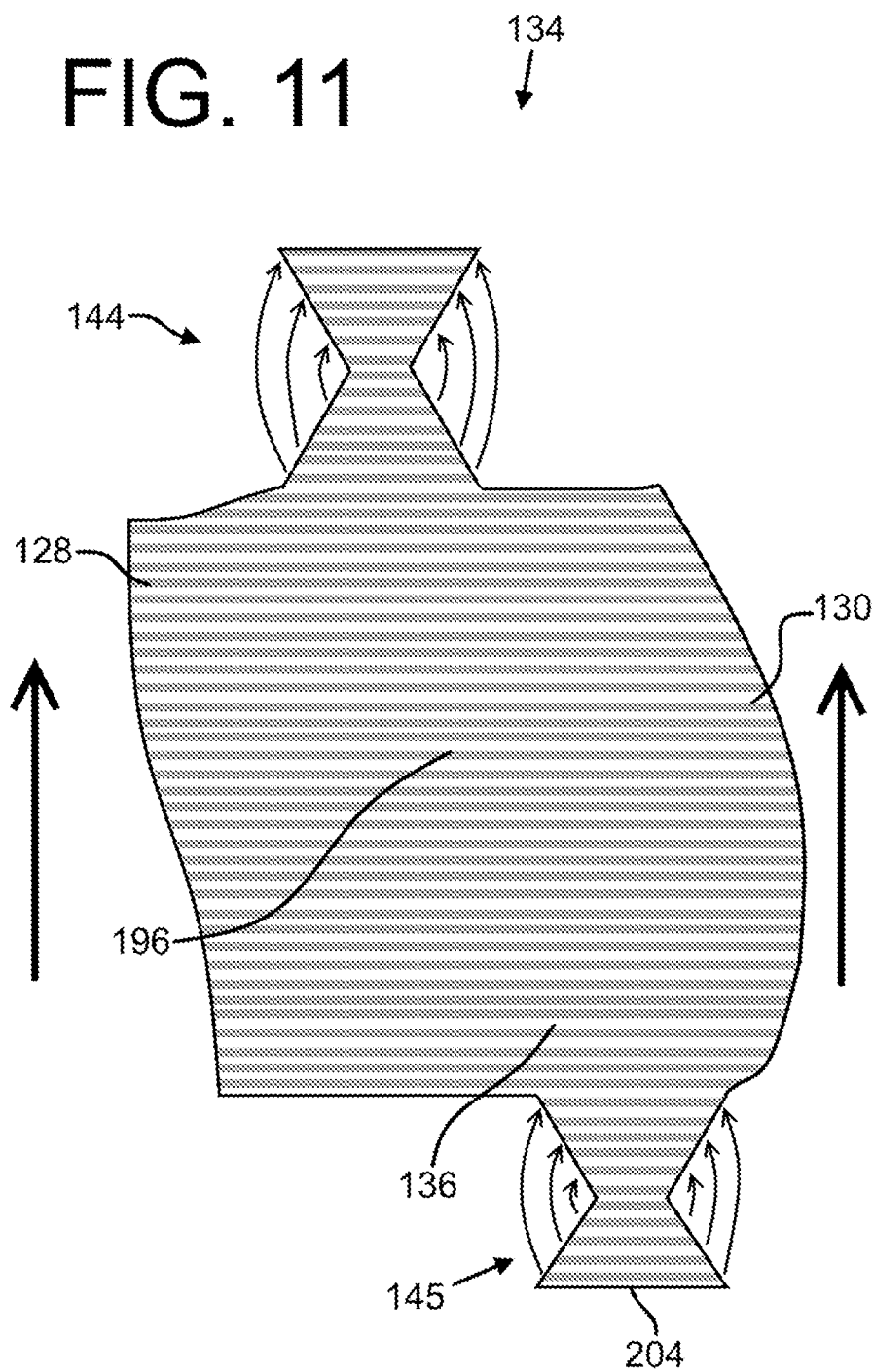
FIG. 11 is a diagram of an embodiment of a knitting process for forming the knitted component of FIGS. 2-9.

FIG. 11 is a diagram illustrating a knitting sequence of the entirety, or substantially the entirety, of the knitted component 134. As shown, the cup-like shape of the heel portion 145 may be formed in a manner similar to the cup-like shape of the toe portion 144. A first edge 204 may represent a first course of the knitted component formed on a knitting machine, and the first edge 204 may form a rear (e.g., heel-side) portion of the collar 118 (shown in FIG. 1). Then, the sequence may continue in the direction depicted by the large bolded arrows. As the pattern narrows, the outer loops of the respective courses may be held on a needle bed of the knitting machine, and they may be rejoined when the pattern again widens.

The central portion 196, which may include at least a portion of the first side 128, the second side 130, and the underfoot portion 136, may be substantially flat during and after the knitting process. The central portion 196 may utilize one or both beds of the knitting machine. The flat nature of the central portion 196 and the ability to utilize two beds of a flat knitting machine may enhance the ability to include certain knit or non-knit features, particularly since utilizing two beds (instead of one) significantly increases the ability to selectively include visual designs, selectively vary physical properties, and incorporate other features formed by a particular knit structure, particular yarn(s), or a combination thereof. To illustrate, one yarn type (e.g., a thermoplastic polymer material yarn) may be located on one surface of the central portion 196 and a different yarn type (e.g., a polyester yarn) may be located on an opposite facing surface of the central portion 196, which may be accomplished when using two needle beds. In another embodiment, the central portion 196 may optionally include separable layers (e.g., a first layer formed on a first bed, a second layer formed on a second bed, and a pocket therebetween), but separable layers are not required in all embodiments, and they are not depicted. Separable layers may be advantageous when forming a pocket for holding certain components, such as a cushioning element, for example. The present embodiments may also be advantageous for providing the ability for a single yarn type (e.g., a high tenacity yarn) to extend substantially around the foot while inlaid within the knitted component 134.

The flat nature of the central portion 196 may additionally or alternatively be advantageous for facilitating performance of post-knitting processes. For example, the flat knitted surfaces of the central portion 196 may be quickly and efficiently printed, painted, or otherwise modified such that the article of footwear includes certain visual designs (e.g., abstract patterns, logos, images, etc.). Further, the flat knitted surfaces may be treated (e.g., sprayed, painted, or printed) after the knitting process to add certain physical properties into the article of footwear (e.g., waterproof-related properties, varying elasticity, etc.).

In the present disclosure, the ranges given either in absolute terms or in approximate terms are intended to encompass both, and any definitions used herein are intended to be clarifying and not limiting. Notwithstanding that the numerical ranges and parameters setting forth the broad scope of the present embodiments are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges (including all fractional and whole values) subsumed therein.

Furthermore, the present disclosure encompasses any and all possible combinations of some or all of the various aspects described herein. It should also be understood that various changes and modifications to the aspects described herein will be apparent to those skilled in the art. Such changes and modifications can be made without departing from the spirit and scope of the present disclosure and without diminishing its intended advantages. It is therefore intended that such changes and modifications be covered by the appended claims.

I claim:

1. A method of forming an upper of an article of footwear, the method comprising:
   knitting a first side of a knitted component;
   knitting a second side of the knitted component, wherein the first side and the second side comprise an overfoot portion;
   knitting an underfoot portion located between the first side and the second side;
   knitting a toe portion on the first side of the knitted component, wherein the toe portion has an underfoot side, an overfoot side, and a cavity between the underfoot side and the overfoot side;

knitting the overfoot side of the toe portion while holding loops on a needle bed of a knitting machine, and joining the loops held on the needle bed to the underfoot side when knitting the underfoot side of the toe portion, wherein a connection structure is formed when joining the loops held on the needle bed to the underfoot side, and wherein the connection structure joins the overfoot side and the underfoot side of the toe portion;

wherein the underfoot side of the toe portion includes a first edge, wherein the underfoot portion includes a second edge, and wherein the method includes joining the first edge to the second edge;

wherein at least a portion of the first side and at least a portion of the second side of the knitted component are both located on one of a medial side or a lateral side of the overfoot portion, wherein when the first side and the second side are joined to form the overfoot portion, the first side is secured to the second side along an overlapped area on the one of the medial side or the lateral side, the overlapped area extending from a toe area to an ankle opening, and wherein a knitted course extends from the first side, through the underfoot portion, and to the second side.

2. The method of claim 1, wherein a connection structure connects the first edge and the second edge together.

3. The method of claim 1, wherein the knitted component is knitted to include a cup-shaped heel portion.

4. The method of claim 1, wherein a first strand of yarn within the knitted course extends from the first side and terminates within the underfoot portion.

5. The method of claim 1, further comprising manipulating the knitted component into a dimensional shape of the upper.

6. The method of claim 1, further comprising concealing the seam.

7. The method of claim 1, wherein the first edge and the second edge are joined together via sewing.

8. The method of claim 1, wherein the first edge and the second edge are joined together via an adhesive.

9. A method of forming an upper of an article of footwear, the method comprising:

knitting a first side of a knitted component;

knitting a second side of the knitted component, wherein the first side and the second side are configured to overlap and wherein the first side and the second side collectively define an overfoot portion;

knitting an underfoot portion located between the first side and the second side, the underfoot portion comprising a first edge and a second edge;

knitting a toe portion on the first side of the knitted component, the toe portion comprising an underfoot side, an overfoot side, and a cavity located between the underfoot side and the overfoot side;

knitting the overfoot side of the toe portion while holding loops on a needle bed of a knitting machine;

joining the loops held on the needle bed to the underfoot side of the toe portion while knitting the underfoot side, thereby forming a connection structure that connects the overfoot side to the underfoot side;

manipulating the knitted component into a dimensional shape of the upper; and joining the first edge and the second edge of the underfoot portion together along an overlapped area on a medial side or a lateral side of the overfoot portion, the overlapped area extending from a toe region to an ankle opening; and knitting a knitted course that extends continuously from the first side, through the underfoot portion, and to the second side.

10. The method of claim 9, wherein the first edge comprises part of a boundary of a toe portion of the knitted component.

11. The method of claim 9, further comprising joining the upper to a sole structure, wherein an entire length of the seam is covered by the sole structure.

12. The method of claim 9, wherein the first edge and the second edge are joined together via sewing.

13. The method of claim 9, wherein the first edge and the second edge are joined together via an adhesive.

14. A method, comprising:

knitting a first side of a knitted component;

knitting a second side of the knitted component, wherein the first side and the second side comprise an overfoot portion;

knitting an underfoot portion located between the first side and the second side;

knitting a toe portion on the first side of the knitted component, wherein the toe portion has an underfoot side, an overfoot side, and a cavity between the underfoot side and the overfoot side;

knitting the overfoot side of the toe portion while holding loops on a needle bed of a knitting machine, and joining the loops held on the needle bed to the underfoot side when knitting the underfoot side of the toe portion, wherein a connection structure is formed when joining the loops held on the needle bed to the underfoot side, and wherein the connection structure joins the overfoot side and the underfoot side of the toe portion;

wherein the underfoot side of the toe portion includes a first edge, wherein the underfoot portion includes a second edge, and wherein the method includes joining the first edge to the second edge;

wherein at least a portion of the first side and at least a portion of the second side of the knitted component are both located on one of a medial side or a lateral side of the overfoot portion, wherein when the first side and the second side are joined to form the overfoot portion, the first side is secured to the second side along an overlapped area on the one of the medial side or the lateral side, the overlapped area extending from a toe area to an ankle opening, and wherein a knitted course extends from the first side, through the underfoot portion, and to the second side.

* * * * *